United States Patent [19]

Currie

[11] Patent Number: 5,226,687

[45] Date of Patent: Jul. 13, 1993

[54] MATERIAL HANDLING SYSTEM INCLUDING A HANGER AND A COME-ALONG ATTACHMENT DEVICE

[75] Inventor: Adam Currie, Ligonier, Pa.

[73] Assignee: Smart Parts, Inc., Latrobe, Pa.

[21] Appl. No.: 838,562

[22] Filed: Feb. 19, 1992

[51] Int. Cl.$^5$ .................................................. B66C 1/10
[52] U.S. Cl. ................................... 294/1.1; 248/231.6; 294/85; 403/3; 403/173
[58] Field of Search .................. 294/1.1, 5.5, 85, 86.4, 294/90, 103.1; 24/135 R, 135 N, 457, 525, 569; 248/58-60, 63, 68.1, 72, 74.4, 218.4, 219.1, 225.31, 228, 230, 231.4, 231.6; 254/409, 413; 403/3, 170, 173, 174, 178

[56] References Cited

U.S. PATENT DOCUMENTS

| | | | |
|---|---|---|---|
| 1,192,039 | 7/1916 | Converse | 403/173 |
| 1,564,918 | 12/1925 | Williams | 248/230 X |
| 1,679,028 | 7/1928 | Gallman | 24/135 R |
| 1,777,884 | 10/1930 | Horix | 248/230 |
| 2,452,406 | 10/1948 | Volkery et al. | 24/569 X |
| 2,582,384 | 1/1952 | Knollman | 248/74.4 X |
| 2,715,537 | 8/1955 | Hofheimer | 403/173 |
| 3,416,830 | 12/1968 | Karr | 294/5.5 |

FOREIGN PATENT DOCUMENTS

217435 12/1967 Sweden ........................... 294/85

Primary Examiner—Johnny D. Cherry
Attorney, Agent, or Firm—Reed Smith Shaw & McClay

[57] ABSTRACT

Apparatus and system including a hanger device which is releasably clampable to a rod. The hanger device includes a pair of blocks each having a plurality of differently configured bore sections therein adapted for cooperating with a plurality of differently configured bore sections of the other block such that predetermined ones of the cooperating bore sections may be aligned to clamp the rod therebetween, whereby the blocks may be clamped to rods of a plurality of different configurations. One of the blocks is provided with a member for suspending a hoist. The apparatus further preferably comprises structure for connecting the hanger device to a come-along device whereby the functions of the hoist and come-along device may be effectively interrelated to lift and substantially horizontally translate material in an efficient and coordinated process.

12 Claims, 3 Drawing Sheets

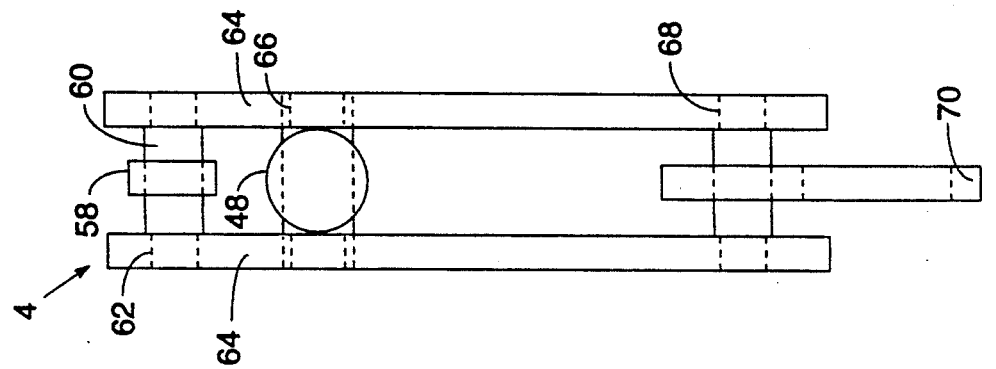
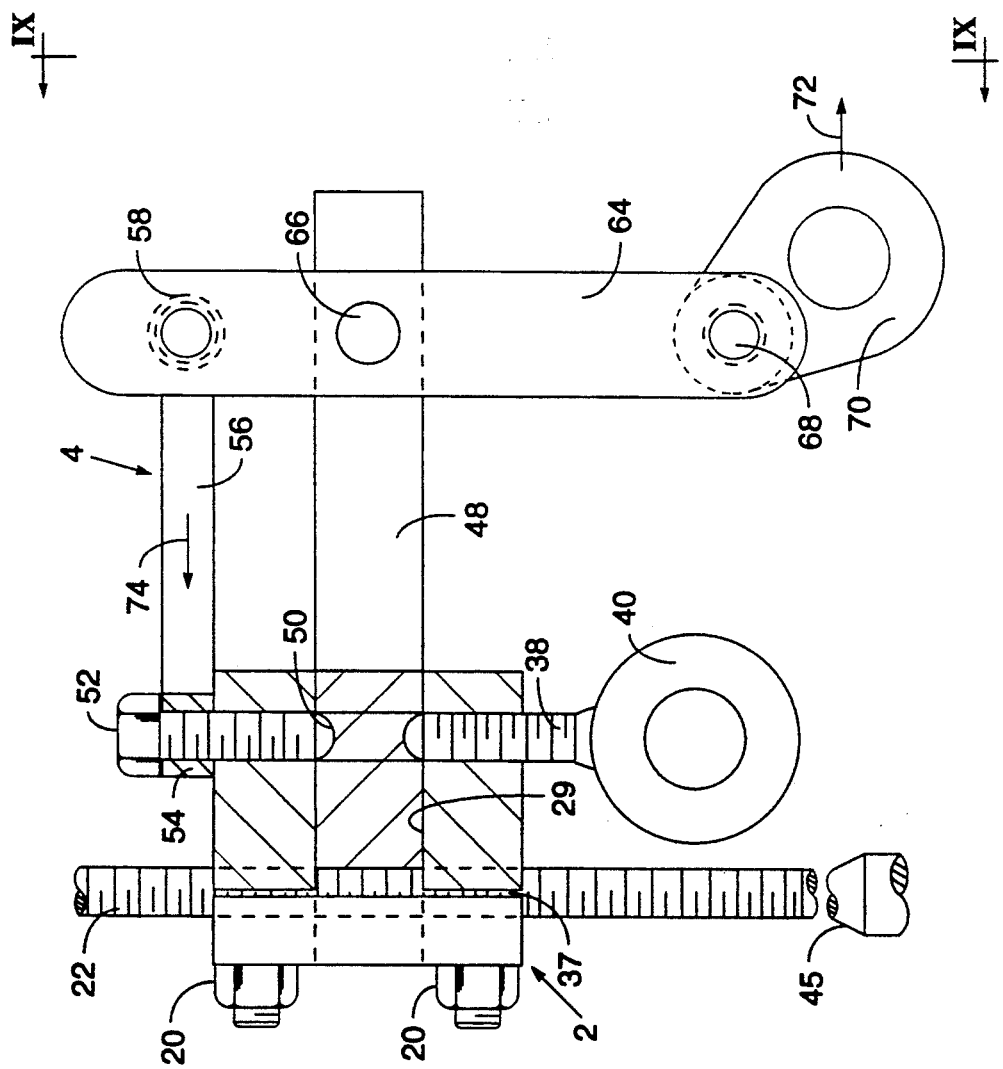

MATERIAL HANDLING SYSTEM INCLUDING A HANGER AND A COME-ALONG ATTACHMENT DEVICE

FIELD OF THE INVENTION

The present invention relates in general to lifting apparatus and, in particular, to apparatus for use with hoisting equipment.

BACKGROUND OF THE INVENTION

A variety of devices are known which are adapted to releasably clamp elongated members, such as, for example, ropes, cables, pipes, tubes, rods, and the like. The applications for such devices are wide ranging including, among others, clamps for use in securing worker safety harnesses to scaffold ropes, tube clamps and clamps for joining oil well pump walking beams to pumping rods. Examples of such clamp devices are disclosed in U.S. Pat. Nos. 1,679,028, 2,296,182, 2,333,646 and 4,597,140.

U.S. Pat. No. 3,416,830 describes a clamp device in the form of a hanger for use with hoisting equipment. The hanger is comprised of two blocks connected by a hinge with a threaded bore centered on the parting line of the blocks. The hanger is assembled on a threaded suspension rod and serves as an anchor site for a hoist adapted to lift a pipe into a position whereat the pipe can be secured in a saddle connected to the threaded rod. The clamp device is capable of fitting only a single rod size or diameter and has no provision enabling the hoist to be simultaneously used in cooperation with a "come-along" or material translation device whereby the functions of the hoist and come-along device may be effectively interrelated to lift and substantially horizontally translate the suspended material in an efficient and coordinated process.

A need exists, therefore, for a clamp device in the form of a hanger for use with hoisting equipment wherein the clamp device is capable of fitting a plurality of rod sizes and which may include provision enabling the hoist to be simultaneously used in cooperation with a come-along device whereby the functions of the hoist and come-along device may be effectively interrelated to lift and substantially horizontally translate the suspended material in an efficient and coordinated process.

SUMMARY OF THE INVENTION

The present invention provides an apparatus including a hanger device which is releasably clampable to a rod. The hanger device includes a pair of blocks each having a plurality of differently configured bore sections therein adapted for cooperating with a plurality of differently configured bore sections of the other block such that predetermined ones of the cooperating bore sections may be aligned to clamp the rod therebetween, whereby the blocks may be clamped to rods of a plurality of different configurations. One of the blocks is provided with a member for suspending a hoist. The apparatus further comprises structure for connecting the hanger device to a come-along device whereby the functions of the hoist and come-along device may be effectively interrelated to lift and substantially horizontally translate material in an efficient and coordinated process.

Other details, objects and advantages of the present invention will become apparent as the following description of the presently preferred embodiments and presently preferred methods of practicing the invention proceeds.

BRIEF DESCRIPTION OF THE DRAWINGS

The invention will become more readily apparent from the following description of preferred embodiments thereof shown, by way of example only, in the accompanying drawing, wherein:

FIG. 8 is a view of the hanger device installed upon a rod and operatively secured to structure for joining the hanger device to a come-along device; and FIG. 9 is a view as seen from line IX—IX of FIG. 8.

DETAILED DESCRIPTION OF THE INVENTION

Figure 1:
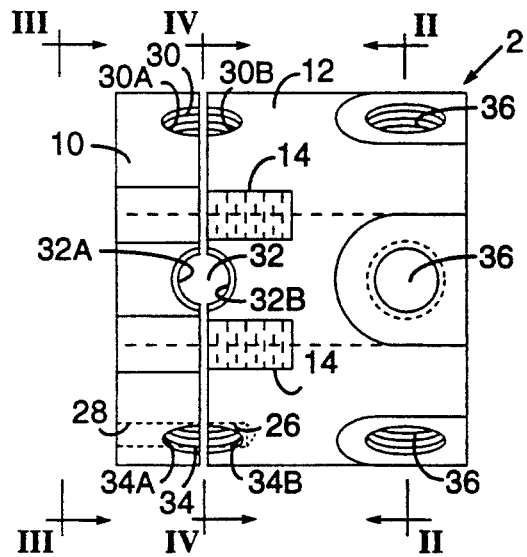
FIG. 1 is a side view of a preferred embodiment of a hanger device of the present invention with some elements omitted for clarity.

The apparatus according to the presently preferred embodiment of the instant invention comprises a hanger device 2 and means 4 (FIGS. 8 and 9) for joining the hanger device 2 to an unillustrated come-along device to enable a hoist 6 (FIG. 7) to be simultaneously used in cooperation with the come-along device whereby the functions of the hoist 6 and come-along device may be effectively interrelated to lift and substantially horizontally translate suspended material such as pipe or tube 8 (FIG. 7) in an efficient and coordinated process.

In order to fully appreciate the details of the hanger device 2, the reader's attention is directed to FIGS. 1-6, wherein like references indicated similar elements, as is true in the remaining views. Hanger device 2 desirably includes first and second blocks 10 and 12 fabricated of any suitable high strength material, such as, for example, cast steel or other metal or metallic alloy.

Block 12, being the deeper block, is preferably provided (through suitable drilling and tapping) with a pair of threaded bores 14, each of which threadably receives fastening means in the form of a threaded fastener 16. Block 10 is provided with a pair of bores 18 which are alignable with fasteners 16. Bores 18 are of sufficient diameter to permit unrestricted passage therethrough of the free ends of the fasteners 16. The fasteners 16 are of sufficient length to permit nuts 20 (FIGS. 5-8) to be threaded thereon so as to enable the blocks to be releasably joined to one another and releasably clamped about a member such as suspension rod 22 in a manner to be described in greater detail hereinbelow. To further assure precise alignment of blocks 10 and 12, an alignment pin 24 (FIGS. 4 and 6) is fixedly retained in a socket 26 of block 12, which pin is slideably and matingly received in bore 28 provided in block 10. Further provided in hanger device 2 is a centrally located bore 29 which serves advantageously to reduce the weight of the hanger device, but which also acts as a securement site for means 4 to be later described which join the hanger device to a come-along device.

Figure 4:
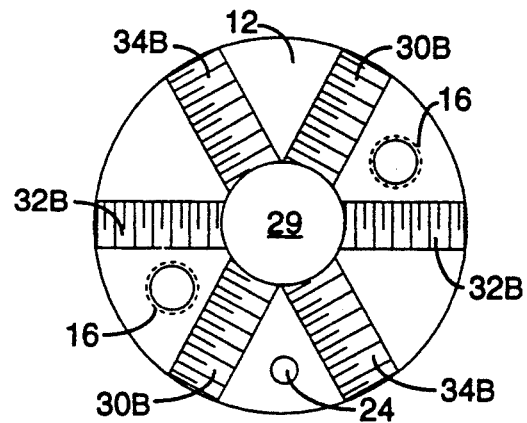
FIG. 4 is a view of the hanger device of FIG. 1 as seen from line IV—IV of FIG. 1.
Figure 6:
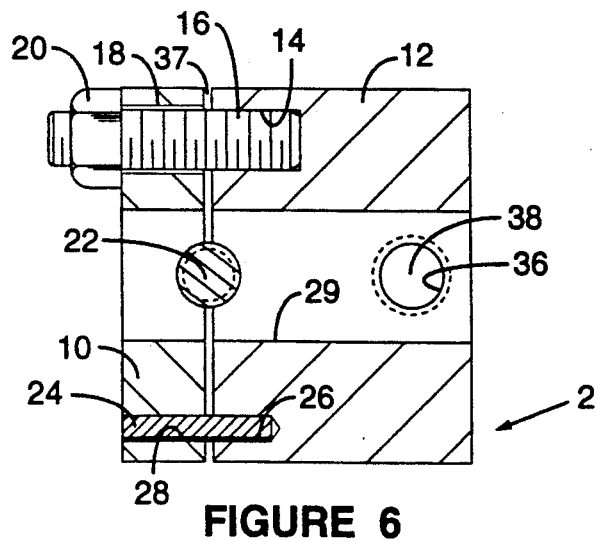
FIG. 6 is a section view of the hanger device of FIG. 5 as seen from line VI—VI of FIG. 5.
Figure 5:
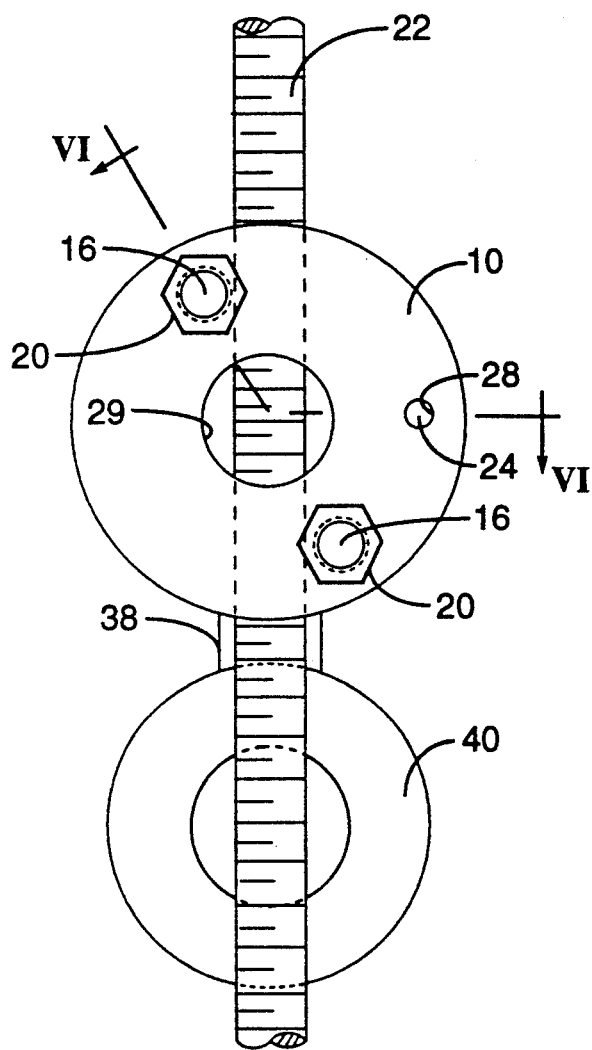
FIG. 5 is an end elevation view of the hanger device of FIG. 1 as it would appear when installed upon a rod.

FIG. 4, when viewed together with FIG. 1, reveals that blocks 10 and 12 are drilled and tapped during manufacture to produce a plurality of (in the preferred embodiment, three) diametrically extending, angularly offset, threaded bores of different diameters, herein designated by reference numerals 30, 32, 34, with essentially half the threading of the bores being formed on block 10 thereby creating a first plurality of bore sections 30A, 32A and 34A and essentially the balance of the threading being formed on block 12 thereby creating a second plurality of bore sections 30B, 32B and 34B. The bores 30, 32 and 34 and thus their associated bore sections intersect one another and are arranged in an angularly spaced array, with central bore 29 extending substantially transverse thereto. In a presently preferred embodiment, the preferred diameters of bores 30, 32 and 34 are $\frac{3}{8}$-inch, $\frac{1}{2}$-inch and $\frac{3}{4}$-inch, respectively, whereby threaded bores 30, 32 and 34 are adapted to cooperatively receive an appropriate member such as threaded rod 22 of mating diameter and threading pattern when blocks 10 and 12 are clamped thereabout, such as is shown in FIG. 6. It will be appreciated that there may be more or less than three such threaded rod-engaging bores depending upon the size of the hanger device and/or its prescribed design requirements. Moreover, the bore configurations, including diameters and thread patterns, may be varied to suit virtually any threaded rod.

The facing surfaces of the blocks 10 and 12 are suitably machined or cut subsequent to threading of bores 30, 32 and 34 such that the bore sections 30A, 30B, 32A, 32B or 34A and 34B do not completely envelop the entire perimeter of the rod when the blocks are installed thereabout. As a result, a slight gap 37 is formed between the blocks, as is shown in FIGS. 6 and 8, when the nuts 20 are turned down into a hand-tight position. The purpose of the gap 37 is that, when the nuts 20 are further tightened or torqued, the radially outermost regions of the block 10 are caused to flex slightly toward their counterpart regions of block 20 under the compression exerted by the nuts such that the clamping force applied by the bore sections against the rod 22 is increased far beyond that which could be obtained were the gap not present. And, since the clamping force is vastly enhanced by the presence of the gap 37, so too is the load bearing capacity of the hanger device when installed upon the rod 22 as compared to that if the gap were not present.

Figure 2:
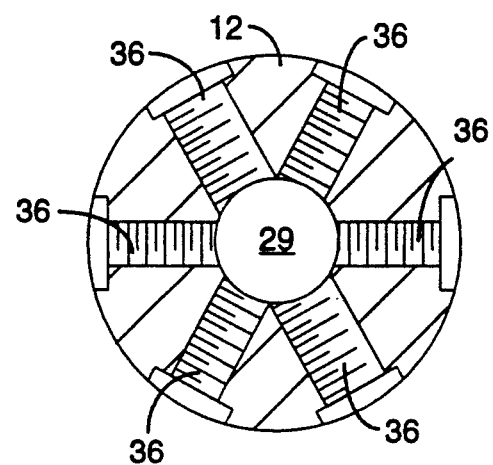
FIG. 2 is a section view of the hanger device of FIG. 1 as seen from line II—II of FIG. 1.
Figure 3:
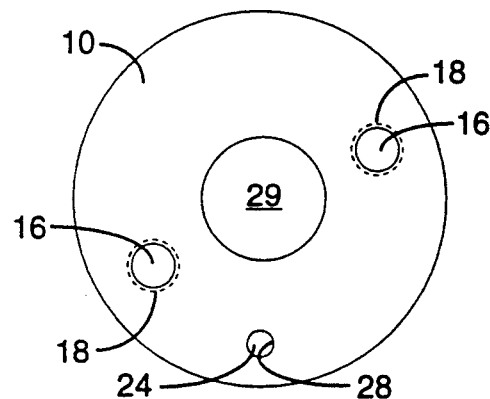
FIG. 3 is a view of the hanger device of FIG. 1 as seen from line III—III of FIG. 1.
Figure 7:
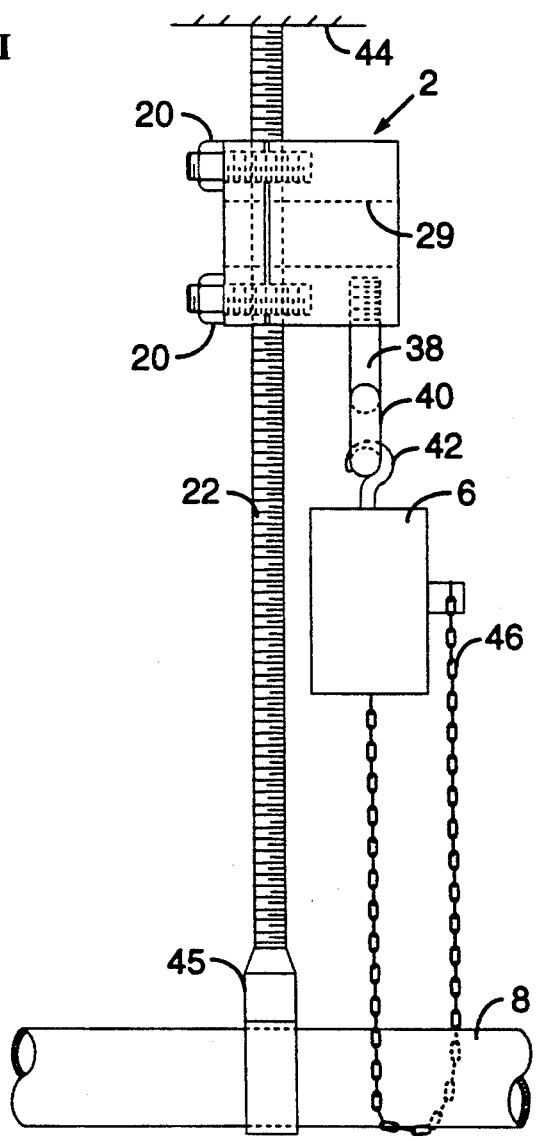
FIG. 7 is a view of a preferred embodiment of the hanger apparatus of the present invention installed upon a rod and employed in conjunction with a hoist to lift material such as a pipe.

FIGS. 1 and 2 most clearly illustrate that there are also drilled and tapped through block 12 a plurality of diametrically extending, angularly offset bores 36 equal in number and parallel to the threaded bores, e.g., 30, 32 and 34, which engage the threaded rod 22. As shown in FIG. 7, bores 36 are adapted to threadably receive the shank 38 of an eyebolt 40 which in turn receives the hook 42 (or similar member) from which the hoist 6 is suspended. From that figure it will be noted that, in operation, the shank 38 of eyebolt 40 is threaded into the lowermost of the bores 36 which is parallel to the rod 22 such that moment exerted on the rod 22 by the hoist, its associated equipment and the load supported thereby, e.g., pipe 8, is minimized.

Referring still to FIG. 7, when lifting material such as pipe 8 using the apparatus of the present invention, the rod 22 is first normally secured by suitable means to a building surface such as the ceiling 44 of the area in which the pipe is to be ultimately disposed. The lower end of the rod 22 typically carries a saddle 45 into which the pipe is placed by operation of hoist 6 and possibly a come-along device (not illustrated). The user then selects a hanger device 2 having an appropriate threading diameter and pattern for mating with the threaded rod 22. Thereafter, the user places the blocks 10 and 12 on opposite sides of the rod and at a predetermined elevation therealong and slides the blocks together such that the appropriate threading, e.g., 30A, 30B or 32A, 32B or 34A, 34B are aligned with and come into mating engagement with the threading of rod 22. The user then places the nuts 20 on threaded fasteners 16 and tightens the nuts to a desired torque so as to slightly flex block 10 through gap 37 and firmly clamp the hanger device 2 on the rod. So placed, the hanger device serves as an anchor site (because of the intermeshing rod threads and block threads) from which to suspend the hoist 6 and its associated equipment. The eyebolt shank 38 is then threaded into the appropriate bore 36 and the hoist hook 42 is placed into the eye of the eyebolt. The chain 46 of the hoist 6 is then looped around the pipe 8 whereupon the free end of the chain is secured to the hoist such that the pipe may then be lifted by the hoist. The arrangement and process described immediately hereinabove is preferably duplicated at a second spaced location along the pipe 8 whereby the pipe may be safely lifted in a substantially horizontal and balanced manner.

The present invention thus provides a hanger device having a substantially wider range of utility than related devices heretofore known in the art such as, for example, the device disclosed in U.S. Pat. No. 3,416,830, which was capable of clamping only one rod configuration. Moreover, for most applications, the hanger device 2 provided herein weighs less than five pounds and is compact in size whereby it can be easily stored and transported in a relatively small portable tool box.

A further embodiment and extension of the present invention is depicted in FIGS. 8 and 9. With reference first to FIG. 8, the hanger device 2 described hereinabove is again shown clamped about a threaded rod 22. As mentioned previously, the apparatus of the present invention includes means 4 for joining the hanger device 2 to an unillustrated come-along device for enabling a hoist such as hoist 6 to be simultaneously used in cooperation with the come-along device whereby the functions of the hoist and come-along device may be effectively interrelated to lift and substantially horizontally translate suspended material such as pipe 8 in an efficient and coordinated process.

Reference numeral 48 designates an arm of means 4 which is dimensioned such that a first end thereof may be inserted into central bore 29 of hanger device 2. Arm 48 is preferably grooved as at 50 whereby the arm may be securely retained within bore 29 by the ends of pinching screws (not shown) desirably oriented 60° apart which are threaded into available ones of the threaded bores 36 and whose shaft ends engage the groove 50 much like the shaft 38 of eyebolt 40 shown in FIG. 8.

A stress pin 52 is threaded into yet another available threaded bore 36 situated opposite the shaft 38 of eyebolt 40. Preferably, stress pin 52 is of sufficient length such that it also engages groove 50 of arm 48. The stress pin 52 passes through a first end eye 54 of a force transmission member 56. The opposite end of the member 56 is provided with a second end eye 58 which receives a bushing 60 of a first pin 62 whose opposite ends are supported in at least one but, preferably, two levers 64 such that the levers may pivot relative to the pin 62. Similarly, arm 48 carries a second pin 66 whose opposite ends are supported in levers 64, whereby the levers may pivot about pin 66. Pivotally supported by a third pin 68 to the lower ends of the levers 64 is a drag link 70 which is connectable to a conventional come-along device.

When force is exerted by the come-along device on the drag link 70 in the direction of arrow 72, the levers 64 are caused to pivot about pin 66 and exert an oppositely directed force as indicated by arrow 74 on member 56, thereby transferring the load to the stress pin 52 in shear. Shear force directed oppositely to that illustrated is experienced in stress pin 52, of course, when the force exerted on the drag link is reversed. Thus, a balanced force transmission system results which essentially eliminates transfer of the horizontal come-along load to the rod 22 while enabling the material borne by the come-along to be brought into proper position for lifting by the hoist.

It is further contemplated, although not explicitly shown, that modification may be made to the apparatus described herein whereby the apparatus would find beneficial application with unthreaded members as well as members such as threaded rod 22 disclosed herein. That is, the bores of the blocks 10 and 12 which receive and clamp onto the suspension rod may be internally lined with hardened knurls or teeth, preferably arranged in a helical pattern, such that the teeth would penetrate or bite into the rod upon the application of sufficient torque to nuts 20 to slightly flex block 10 through gap 37, thereby firmly clamping the hanger device to the rod.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. Apparatus for use with hoisting equipment, said apparatus comprising:
    a hanger including first and second blocks wherein each block has a plurality of differently configured bore sections suited for cooperating with a plurality of differently configured bore sections of the other block, at least one of said blocks including a central bore extending substantially transverse to said plurality of differently configured bore sections of said blocks;
    means for securing said first and second blocks together so as to align predetermined ones of said cooperating bore sections and clamp a member therebetween;
    means carried by one of said blocks for supporting a hoist;
    a thrust pin connected to one of said blocks and passing through a force transmission member, said force transmission member including a first pivot pin pivotally connected generally at a first end of at least one lever;
    a link connected generally at a second end of said at least one lever; and
    an arm received at one end thereof in said central bore and carrying a second pivot pin pivotally connected to said at least one lever at a location intermediate said first and second ends thereof, whereby substantially horizontally directed force applied to said link results in an oppositely directed force being applied to said thrust pin via said force transmission member.

2. The apparatus of claim 1 wherein said cooperating bore sections envelop less than the entire perimeter of the member to be clamped therebetween.

3. The apparatus of claim 1 wherein said differently configured bore sections of said blocks comprise bore sections of different sizes.

4. The apparatus of claim 3 wherein said differently configured bore sections of said blocks are threaded for enabling meshing engagement with a threaded member.

5. The apparatus of claim 1 wherein said differently configured bore sections of said blocks are threaded for enabling meshing engagement with a threaded member.

6. The apparatus of claim 1 wherein said plurality of differently configured bore sections of each block intersect one another and are arranged in an angularly spaced array.

7. A material handling system, said system comprising:
    a hoist device for lifting said material;
    a member which is securable to a building surface;
    a hanger device including first and second blocks wherein each block has a plurality of differently configured bore sections suited for cooperating with a plurality of differently configured bore sections of the other block, at least one of said blocks including a central bore extending substantially transverse to said plurality of differently configured bore sections of said blocks;
    means for securing said first and second blocks together so as to align predetermined ones of said cooperating bore sections and clamp said member therebetween;
    means carried by one of said blocks for supporting said hoist device;
    a thrust pin connected to one of said blocks and passing through a force transmission member, said force transmission member including a first pivot pin pivotally connected generally at a first end of at least one lever;
    a link connected generally at a second end of said at least one lever; and
    an arm received at one end thereof in said central bore and carrying a second pivot pin pivotally connected to said at least one lever at a location intermediate said first and second ends thereof, whereby substantially horizontally directed force applied to said link results in an oppositely directed force being applied to said thrust pin via said force transmission member.

8. The system of claim 7 wherein said cooperating bore sections envelop less than the entire perimeter of said member clamped therebetween.

9. The system of claim 7 wherein said differently configured bore sections of said blocks comprise bore sections of different sizes.

10. The system of claim 9 wherein said member is threaded and said differently configured bore sections of said blocks are threaded for enabling meshing engagement thereof with said threaded member.

11. The system of claim 7 wherein said member is threaded and said differently configured bore sections of said blocks are threaded for enabling meshing engagement thereof with said threaded member.

12. The system of claim 7 wherein said plurality of differently configured bore sections of each block intersect one another and are arranged in an angularly spaced array.

* * * * *